(12) United States Patent
Kuretake

(10) Patent No.: US 11,433,876 B2
(45) Date of Patent: Sep. 6, 2022

(54) VEHICLE DRIVE SOURCE CONTROL BASED ON PRECEDING VEHICLE

(71) Applicant: TOYOTA JIDOSHA KABUSHIKI KAISHA, Toyota (JP)

(72) Inventor: Ken Kuretake, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 243 days.

(21) Appl. No.: 16/168,021

(22) Filed: Oct. 23, 2018

(65) Prior Publication Data

US 2019/0118798 A1    Apr. 25, 2019

(30) Foreign Application Priority Data

Oct. 25, 2017    (JP) .............................. JP2017-206430

(51) Int. Cl.
*B60W 20/40* (2016.01)
*B60W 10/08* (2006.01)
(Continued)

(52) U.S. Cl.
CPC ............ *B60W 20/40* (2013.01); *B60W 10/06* (2013.01); *B60W 10/08* (2013.01); *B60W 30/16* (2013.01);
(Continued)

(58) Field of Classification Search
CPC .. B60W 20/40; B60W 50/0098; B60W 30/16; B60W 10/06; B60W 10/08;
(Continued)

(56) References Cited

U.S. PATENT DOCUMENTS

2006/0142121 A1\* 6/2006 Moriya ............... F02N 11/0833
477/199
2011/0257862 A1 10/2011 Lee et al.
(Continued)

FOREIGN PATENT DOCUMENTS

CN          102219019 A     10/2011
DE          10129878 A1 \*   2/2003 ........... F02D 41/042
(Continued)

*Primary Examiner* — Jess Whittington
(74) *Attorney, Agent, or Firm* — Finnegan, Henderson, Farabow, Garrett & Dunner, LLP

(57) ABSTRACT

A vehicle comprising an internal combustion engine, a preceding vehicle information acquiring device for acquiring preceding vehicle information relating to a preceding vehicle, including a parameter relating to a distance between vehicles which becomes greater the wider the distance between a host vehicle and the preceding vehicle, and an electronic control unit for controlling the internal combustion engine, in which, the electronic control unit is configured so that when the parameter becomes a first predetermined value or more during the idle reduction mode where the internal combustion engine is automatically made to stop, it makes the internal combustion engine automatically restart and so that if the host vehicle continues stopped even after making the internal combustion engine automatically restart, it again makes the internal combustion engine automatically stop when the preceding vehicle has stopped before the parameter becomes a second predetermined value larger than the first predetermined value.

8 Claims, 6 Drawing Sheets

(51) Int. Cl.

| | |
|---|---|
| *B60W 30/18* | (2012.01) |
| *B60W 10/06* | (2006.01) |
| *G08G 1/0967* | (2006.01) |
| *B60W 30/16* | (2020.01) |
| *B60W 50/00* | (2006.01) |
| *G08G 1/0962* | (2006.01) |
| *F02N 11/08* | (2006.01) |
| *G06V 20/56* | (2022.01) |

(52) U.S. Cl.
CPC .. *B60W 30/18054* (2013.01); *B60W 50/0098* (2013.01); *F02N 11/0837* (2013.01); *G06V 20/56* (2022.01); *G08G 1/0962* (2013.01); *G08G 1/09675* (2013.01); *G08G 1/096725* (2013.01); *G08G 1/096741* (2013.01); *G08G 1/096791* (2013.01); *B60T 2201/022* (2013.01); *B60W 2554/80* (2020.02); *B60W 2554/801* (2020.02); *F02N 2200/125* (2013.01)

(58) Field of Classification Search
CPC ....... B60W 30/18054; B60W 2550/30; B60W 2550/308; B60W 2554/80; B60W 2554/801; F02N 11/0837; F02N 2200/125; G08G 1/09675; G08G 1/096791; G08G 1/0962; G08G 1/096725; G08G 1/096741; G06K 9/00791; B60T 2201/022
See application file for complete search history.

(56) References Cited

U.S. PATENT DOCUMENTS

| | | | |
|---|---|---|---|
| 2013/0103235 A1* | 4/2013 | Lee | B60W 30/18063 |
| | | | 701/22 |
| 2014/0195087 A1* | 7/2014 | Ideshio | B60W 10/02 |
| | | | 701/22 |
| 2014/0288798 A1 | 9/2014 | Ando et al. | |
| 2015/0019113 A1* | 1/2015 | Chang | B60W 10/06 |
| | | | 701/113 |
| 2015/0204253 A1 | 7/2015 | Yang et al. | |
| 2016/0016469 A1 | 1/2016 | Yamada | |
| 2016/0215747 A1* | 7/2016 | Huber | F02N 11/0837 |
| 2017/0249848 A1 | 8/2017 | Niino et al. | |
| 2018/0038952 A1* | 2/2018 | Shokonji | G01S 17/86 |
| 2019/0017486 A1* | 1/2019 | Kuretake | B60W 30/18018 |
| 2022/0003175 A1* | 1/2022 | Koike | B60W 10/06 |

FOREIGN PATENT DOCUMENTS

| | | | |
|---|---|---|---|
| EP | 2 586 644 A1 | | 5/2013 |
| JP | 11-257114 | | 9/1999 |
| JP | 2000045819 A | * | 2/2000 |
| JP | 2006-316644 | | 11/2006 |
| JP | 2014-184879 A | | 10/2014 |
| JP | 2016-025683 A | | 2/2016 |
| JP | 2016-050490 A | | 4/2016 |
| JP | 2016070241 A | * | 5/2016 |
| JP | 6221929 B2 | | 11/2017 |
| KR | 10-2011-0114986 A | | 10/2011 |
| KR | 10-2013-0042967 A | | 4/2013 |
| WO | WO-3001055 | * | 1/2003 |

* cited by examiner

VEHICLE DRIVE SOURCE CONTROL BASED ON PRECEDING VEHICLE

FIELD

The present disclosure relates to a vehicle.

CROSS-REFERENCE TO RELATED APPLICATION

This application claims priority based on Japanese Patent Application No. 2017-206430 filed with the Japan Patent Office on Oct. 25, 2017, the entire contents of which are incorporated into the present specification by reference.

BACKGROUND

JP2006-316644A discloses a conventional vehicle where when an amount of change of a distance from a preceding vehicle becomes a predetermined amount or more, it is judged that the preceding vehicle has started to move and an internal combustion engine in an idle reduction mode is automatically made to restart. Due to this, it is considered possible to make a host vehicle smoothly start moving along with the preceding vehicle starting to move.

SUMMARY

However, sometimes, for example, when the host vehicle temporarily stops due to congestion etc., the preceding vehicle will start to move (accelerate) and the amount of change of the distance from the preceding vehicle will become a predetermined amount or more, then the preceding vehicle will immediately end up decelerating and stopping. At the time of such traffic conditions, even if noticing the preceding vehicle starting to move, some drivers may not start to move the host vehicle. That is, in the case of the conventional vehicle explained above, despite the driver not intending to start to move the vehicle, the internal combustion engine might be made to restart during the idle reduction mode along with the preceding vehicle starting to move and the idling state might end up continuing as it is resulting in deterioration of the fuel efficiency.

Further, in the case of an electric vehicle provided with a traction motor instead of an internal combustion engine, it is possible to drive the traction motor in advance to make it generate a drive force corresponding to the creep torque when the preceding vehicle starts to move and thereby make the host vehicle start to move smoothly tracking the preceding vehicle starting to move. However, if the traction motor ends up continuing to be driven despite the driver not intending to start to move the vehicle, electric power will be wastefully consumed while the vehicle is stopped, so the electrical power efficiency is liable to deteriorate.

The present disclosure was made focusing on this problem and has as its object to keep the fuel efficiency or electrical power efficiency from deteriorating.

To solve the above problem, a vehicle according to one aspect of the present disclosure comprises a vehicle drive source, a preceding vehicle information acquiring device configured to acquire preceding vehicle information relating to a preceding vehicle, including a parameter relating to a distance between vehicles which becomes greater the wider the distance between a host vehicle and the preceding vehicle, and an electronic control unit configured to control the vehicle drive source. Further, an internal combustion engine is provided as the vehicle drive source, and the electronic control unit is configured so that when the parameter becomes a first predetermined value or more during the idle reduction mode where the internal combustion engine is automatically made to stop, it makes the internal combustion engine automatically restart and so that if the host vehicle continues stopped even after making the internal combustion engine automatically restart, it again makes the internal combustion engine automatically stop when the preceding vehicle has stopped before the parameter becomes a second predetermined value larger than the first predetermined value.

Further, a vehicle according to another aspect of the present disclosure comprises a vehicle drive source, a preceding vehicle information acquiring device configured to acquire preceding vehicle information relating to a preceding vehicle, including a parameter relating to a distance between vehicles which becomes greater the wider the distance between a host vehicle and the preceding vehicle, and an electronic control unit configured to control the vehicle drive source. Further, a traction motor is provided as the vehicle drive source, and the electronic control unit is configured so that when the parameter becomes a first predetermined value or more while the vehicle is at a stop, it drives the traction motor and so that if the host vehicle continues stopped even after driving the traction motor, it stops driving the traction motor when the preceding vehicle has stopped before the parameter becomes a second predetermined value larger than the first predetermined value.

According to the vehicles according to these aspects of the present disclosure, it is possible to keep the fuel efficiency or electric power efficiency from deteriorating.

DESCRIPTION OF EMBODIMENTS

Figure 1:
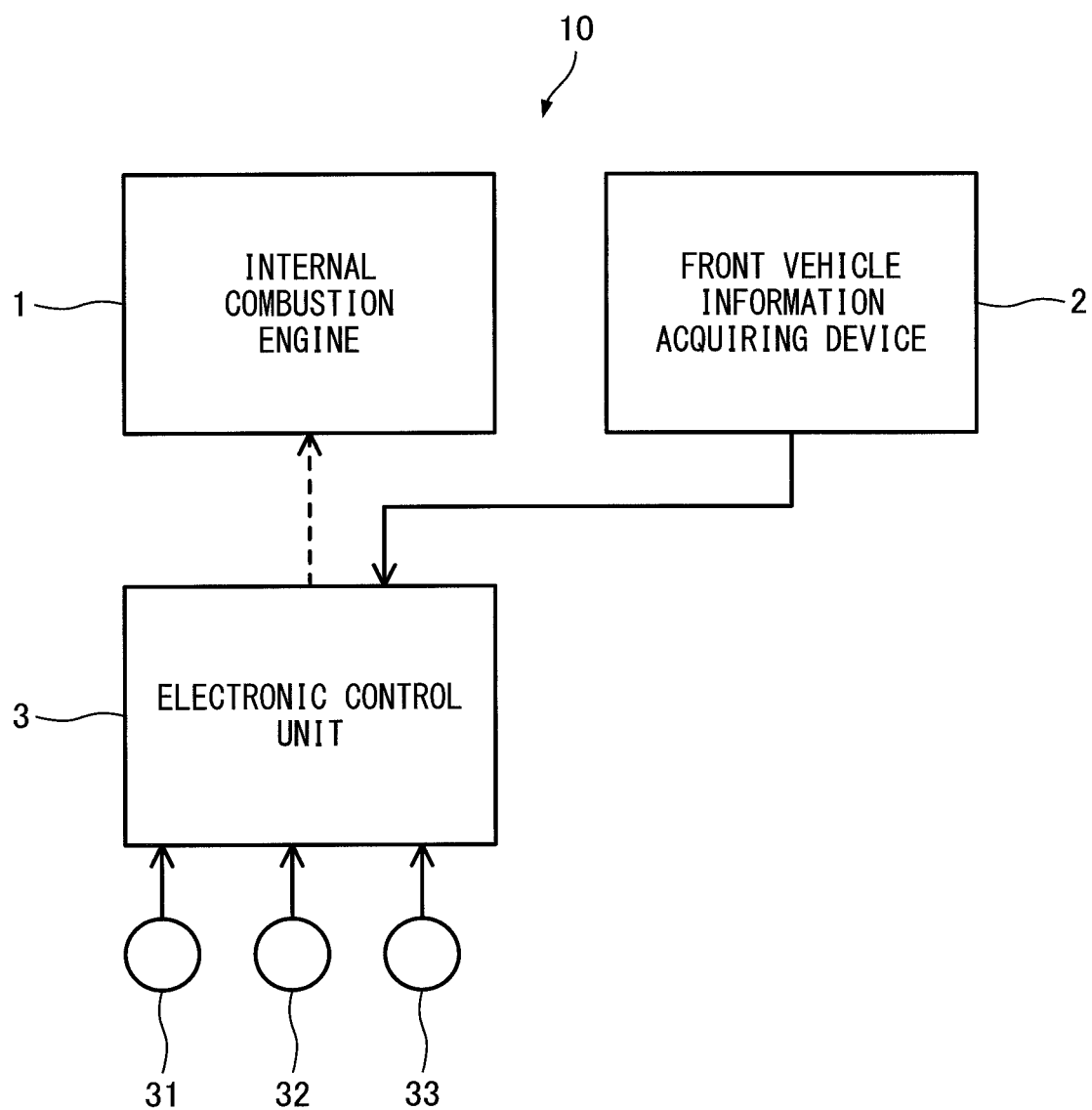
FIG. 1 is a schematic view of the configuration of an idle reduction control system in a vehicle according to a first embodiment of the present disclosure.

Below, referring to the drawings, embodiments of the present disclosure will be explained in detail. Note that, in the following explanation, similar components are assigned the same reference notations.

First Embodiment

FIG. 1 is a schematic view of the configuration of an idle reduction control system in a vehicle 10 according to a first embodiment of the present disclosure.

A vehicle 10 comprises an internal combustion engine 1 as a vehicle drive source, a preceding vehicle information acquiring device 2, and an electronic control unit 3.

The internal combustion engine 1 generates a drive force for driving the vehicle 10.

The preceding vehicle information acquiring device 2 is a device which, for example, acquires a distance between a host vehicle and a preceding vehicle or a parameter relating to a distance between vehicles which becomes greater the wider the distance between the host vehicle and the preceding vehicle such as the distance of movement of the preceding vehicle after the preceding vehicle starts to move and the time period of movement of the preceding vehicle after the preceding vehicle starts to move or information relating to the preceding vehicle such as the speed and acceleration of the preceding vehicle (below, referred to as "preceding vehicle information") and transmits the acquired preceding vehicle information to the electronic control unit 3. As such a preceding vehicle information acquiring device 2, for example, a milliwave radar sensor or camera for capturing the front of the host vehicle, a vehicle-to-vehicle communicating device for vehicle-to-vehicle communication with another vehicle, etc. may be mentioned.

In the present embodiment, a milliwave radar sensor is used as the preceding vehicle information acquiring device 2, the distance from the preceding vehicle and the speed and acceleration of the preceding vehicle are calculated based on a reflected wave of a milliwave fired to the front of the host vehicle, and these are transmitted as the preceding vehicle information to the electronic control unit 3. Note that the preceding vehicle information acquiring device 2 may also be configured by a plurality of devices such as the above-mentioned milliwave radar sensor, camera, etc.

The electronic control unit 3 is a microcomputer provided with components connected with each other by a bidirectional bus such as a central processing unit (CPU), read only memory (ROM), random access memory (RAM), input port, and output port.

The electronic control unit 3 is configured to be able to perform control to start an idle reduction mode where the internal combustion engine 1 is made to automatically stop when a predetermined engine stop condition stands and make the internal combustion engine 1 automatically restart when a preset engine restart condition stands (below, referred to as "idle reduction control"). The electronic control unit 3 receives not only the above-mentioned preceding vehicle information, but also information (signals) from various sensors required for the idle reduction control such as an accelerator stroke sensor 31 for detecting an amount of depression of an accelerator pedal (below referred to as an "amount of accelerator depression"), brake stroke sensor 32 for detecting an amount of depression of a brake pedal (below, referred to as an "amount of brake pedal depression"), and an SOC sensor 33 for detecting an amount of charging of a battery (not shown) mounted in the vehicle 10.

Below, the idle reduction control according to the present embodiment which the electronic control unit 3 performs will be explained.

If a host vehicle temporarily stops due to a red light etc., sometimes the driver will not notice the preceding vehicle starting to move and will be slow to start to move the host vehicle. In particular, when temporarily stopping in the idle reduction state, it is necessary to make the internal combustion engine 1 in the idle reduction state restart before starting to move the host vehicle, so the time from when the driver notices the preceding vehicle starting to move to when starting to move the host vehicle becomes longer and the host vehicle is easily more greatly delayed in starting to move. Such a delay in starting to move the vehicle 10 is liable to cause congestion.

As the method of suppressing such a delay in starting to move the vehicle 10, for example, as shown in the prior art described in PTL 1 described above, it may be considered to judge that the preceding vehicle has started to move and to make the internal combustion engine 1 in the idle reduction state restart when the amount of change in the distance from the preceding vehicle becomes a predetermined amount or more. Due to this, it is possible to start to move the host vehicle immediately after the driver notices the preceding vehicle starting to move and, in some cases, possible to draw the attention of the driver to make him notice the preceding vehicle starting to move by the noise or vibration caused by restart of the internal combustion engine 1.

However, for example, when the host vehicle temporarily stops due to congestion etc., sometimes the preceding vehicle starts to move (accelerates) and the amount of change of distance from the preceding vehicle becomes a predetermined amount or more, then the preceding vehicle ends up immediately decelerating and stopping. At the time of such traffic conditions, even if having noticed the preceding vehicle starting to move, depending on the driver, he might not start to move the host vehicle. That is, with the method of the conventional example explained above, the internal combustion engine may be restarted along with the preceding vehicle starting to move during the idle reduction mode despite the driver not intending to start to move the vehicle and the idle state may end up continuing as it is. The fuel efficiency is therefore liable to deteriorate.

Therefore, in the present embodiment, it was decided that when the distance from the preceding vehicle became a predetermined first distance A1 or more during the idle reduction mode, the internal combustion engine 1 would be made to restart once so as to suppress a delay in the vehicle starting to move. Further, it was decided that when the host vehicle continued to be stopped even after making the internal combustion engine 1 restart and the preceding vehicle stopped before the distance from the preceding vehicle became a predetermined second distance B1 larger than the first distance A1, it would be judged that the driver did not intend to start to move the host vehicle and that to keep the fuel efficiency from deteriorating, the internal combustion engine 1 would be made to automatically stop and return to the idle reduction state.

Figure 2:
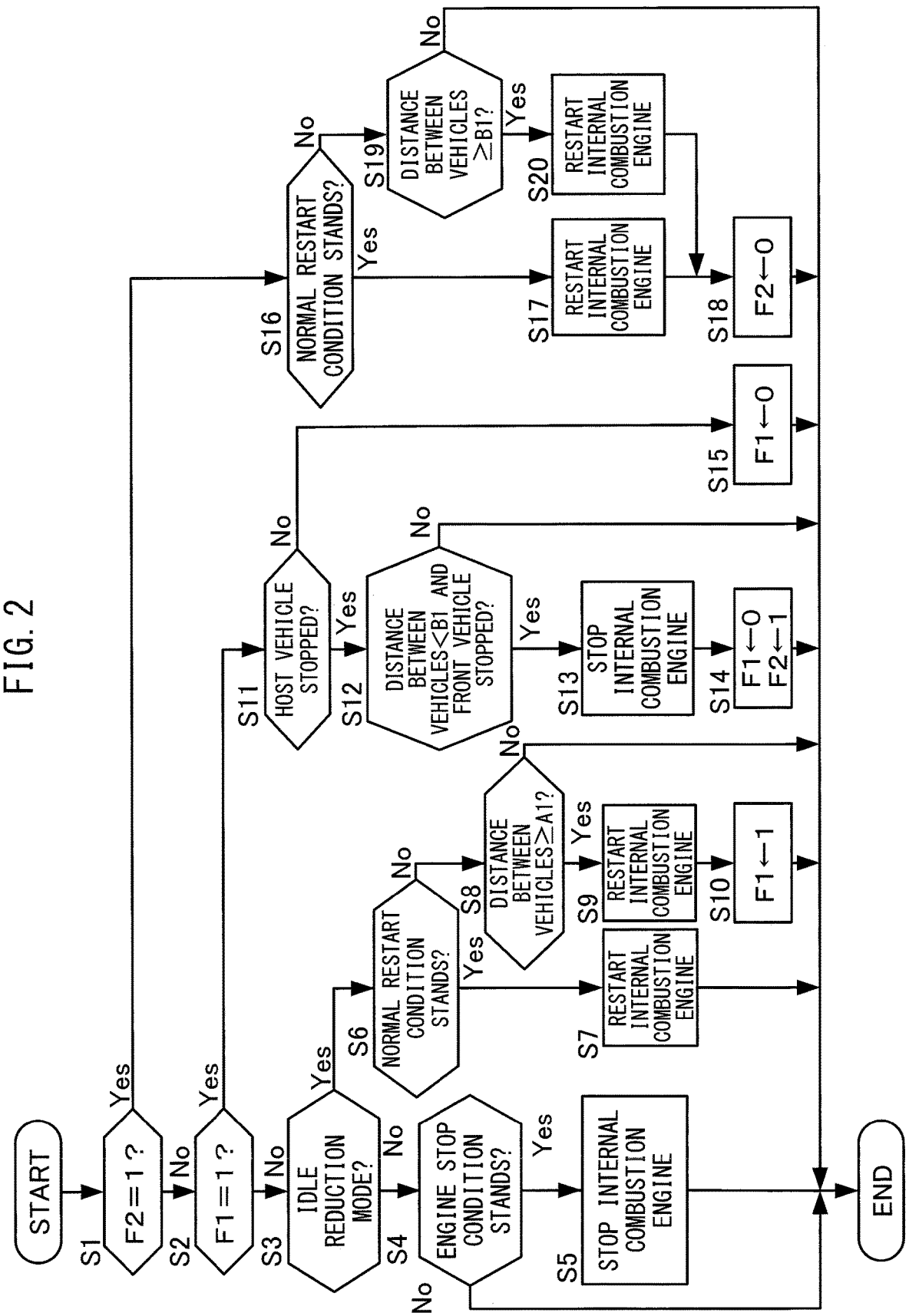
FIG. 2 is a flow chart for explaining idle reduction control according to the first embodiment of the present disclosure.

FIG. 2 is a flow chart for explaining the idle reduction control according to the present embodiment. The electronic control unit 3 repeatedly performs the present routine during operation of the vehicle 10 by a predetermined processing period.

At step S1, the electronic control unit 3 judges if a flag F2 has been set to "1". The flag F2 is a flag which is set to "1" when during the idle reduction mode the distance between vehicles becomes the first distance A1 or more, the internal combustion engine 1 is restarted, then before the distance between vehicles becomes the second distance B1, the preceding vehicle stops and the idle reduction state is returned to. The initial value of the flag F2 is set to "0". The electronic control unit 3 proceeds to the processing of step S2 if the flag F2 is "0". On the other hand, the electronic control unit 3 proceeds to the processing of step S16 if the flag F2 is "1".

At step S2, the electronic control unit 3 judges if the flag F1 is set to "1". The flag F1 is a flag which is set to "1" when during the idle reduction mode the distance between vehicles becomes the first distance A1 or more and the internal combustion engine 1 is restarted. The initial value of the flag F1 is set to "0". The electronic control unit 3 proceeds to the processing of step S3 if the flag F1 is "0". On the other hand, the electronic control unit 3 proceeds to the processing of step 11 if the flag F1 is "1".

At step S3, the electronic control unit 3 judges if the engine is operating in the idle reduction mode. The electronic control unit 3 proceeds to the processing of step S4 if the engine is not in the idling reduction mode. On the other hand, the electronic control unit 3 proceeds to the processing of step S6 if the engine is in the idle reduction mode.

At step S4, the electronic control unit 3 judges if the engine stop condition stands. The electronic control unit 3 proceeds to the processing of step S5 if the engine stop condition stands. On the other hand, the electronic control unit 3 ends the current processing if the engine stop condition does not stand.

Note that as the engine stop condition, for example, the speed of the host vehicle (vehicle speed) being 0 km/h, the brake pedal being depressed (that is, the amount of brake depression being a certain amount or more), the accelerator pedal not being depressed (that is, the amount of accelerator depression being zero), and the amount of charging of the battery being a predetermined amount or more, etc. may be mentioned.

At step S5, the electronic control unit 3 makes the internal combustion engine 1 automatically stop. Due to this, it is possible to improve the fuel efficiency, exhaust emission, and sound and vibration performance while the vehicle is temporarily stopped such as due to a red light or congestion etc.

At step S6, for example, if the driver intends to start to move the host vehicle etc., the electronic control unit 3 judges if an engine restart condition other than the engine restart condition according to the present embodiment explained at step S8 or step S19 (below, referred to as the "normal restart condition") stands. The electronic control unit 3 proceeds to the processing of step S7 if the normal restart condition stands. On the other hand, the electronic control unit 3 proceeds to the processing of step S8 if the normal restart condition does not stand.

Note that as the normal restart condition, for example, the brake pedal not being depressed (that is, the amount of brake depression being zero), the shift lever being in the drive range (for example, the D range or R range), etc. may be mentioned.

At step S7, the electronic control unit 3 makes the internal combustion engine 1 automatically restart.

At step S8, the electronic control unit 3 judges if there is a possibility of the driver not having noticed the preceding vehicle starting to move. Specifically, the electronic control unit 3 judges if the distance between vehicles is the predetermined first distance A1 or more. The first distance A1 is the distance between vehicles believed sufficient to start to move the host vehicle under normal traffic conditions where no congestion has occurred. The first distance A1 may be a fixed value set in advance or may be made changeable according to the preference of the driver.

The electronic control unit 3 judges that there is a possibility that the driver has not noticed the preceding vehicle starting to move and proceeds to the processing of step S9 if the distance between vehicles is the first distance A1 or more. On the other hand, the electronic control unit 3 ends the current processing and continues the idle reduction mode if the distance between vehicles is less than the first distance A1.

At step S9, since there is a possibility the driver has not noticed the preceding vehicle starting to move, the electronic control unit 3 makes the internal combustion engine 1 automatically restart even if the normal restart condition does not stand so as to keep the vehicle from being delayed in starting to move. Due to this, it is possible to start to move the host vehicle immediately after the driver notices the preceding vehicle starting to move and, in some cases, possible to draw the attention of the driver to make him notice the preceding vehicle starting to move by the noise or vibration caused by restart of the internal combustion engine 1.

Note that, when making the internal combustion 1 restart along with the preceding vehicle starting to move in this way, when making the internal combustion engine 1 restart or before that, it is possible to inform the driver of the preceding vehicle starting to move by, for example, sounding a buzzer or displaying text information or graphic information for conveying the fact of the preceding vehicle starting to move on a display mounted in the vehicle. Due to this, it is possible to more reliably make the driver aware of the preceding vehicle starting to move.

Further, if deciding to always inform the driver of the preceding vehicle starting to move when making the internal combustion engine 1 restart or before that, for example, when the buzzer malfunctions or some other reason causes it to become no longer possible to inform the driver of the preceding vehicle starting to move, it is also possible not to make the internal combustion engine 1 restart but to continue the idle reduction mode until the normal restart condition stands.

At step S10, the electronic control unit 3 sets the flag F1 to "1".

At step S11, the electronic control unit 3 judges if the host vehicle continues to be stopped even after the distance between vehicles becomes the first distance A1 or more.

The electronic control unit 3 proceeds to the processing of step S12 if the host vehicle has stopped. On the other hand, the electronic control unit 3 proceeds to the processing of step S15 and returns the flag F1 to "0" so as to make the internal combustion engine 1 automatically stop as usual when the engine stop condition next stands if the host vehicle is running.

At step S12, the electronic control unit 3 judges if there is the possibility of the driver not starting to move the host vehicle depending on the traffic conditions. Specifically, the electronic control unit 3 judges if the distance between vehicles is less than the predetermined second distance B1 larger than the first distance A1 and if the preceding vehicle has stopped. That is, the electronic control unit 3 judges if the preceding vehicle stopped before the distance between vehicles became the second distance B1 if the host vehicle continued to be stopped even after the distance between vehicles became the first distance A1 or more and the internal combustion engine 1 is made to restart. The second distance B1, if considering the rear vehicle, is the distance between vehicles believed sufficient to start to move the host vehicle regardless of the traffic conditions. The second distance B1 may be a fixed value set in advance or may be made changeable according to the preference of the driver.

The electronic control unit 3 judges if there is the possibility of the driver not noticing the preceding vehicle starting to move or of the driver not starting to move the host vehicle due to the traffic conditions and proceeds to the processing of step S13 if the distance between vehicles is less than the second distance B1 and the preceding vehicle is stopped. On the other hand, the electronic control unit 3 ends the current processing and maintains the idle state as it is in preparation for starting to move the host vehicle since the distance between vehicles is the second distance B1 or more or there is the possibility of the driver starting to move the host vehicle if the preceding vehicle is moving.

At step S13, the electronic control unit 3 makes the internal combustion engine 1 automatically stop and return to the idle reduction state. Due to this, it is possible to keep the internal combustion engine 1 from being restarted along with the preceding vehicle starting to move while the host vehicle is stopped despite the driver not intending to start to move the vehicle and to keep the idle state from ending up being continued as it is. That is, it is possible to again make the internal combustion engine 1 automatically stop and return to the idle reduction state suitably in accordance with the traffic conditions when the internal combustion engine 1 is restarted along with the preceding vehicle starting to move while the host vehicle is stopped. Therefore, it is possible to keep the fuel efficiency and exhaust emissions and the noise and vibration performance while the vehicle is stopped from deteriorating.

At step S14, the electronic control unit 3 returns the flag F1 to "0" and sets the flag F2 to "1".

At step S15, the electronic control unit 3 returns the flag F1 to "0" so as to enable the internal combustion engine 1 to be made to automatically stop as usual when the engine stop condition next stands.

At step S16, the electronic control unit 3 judges if the normal restart condition stands.

The electronic control unit 3 proceeds to the processing of step S17 if the normal restart condition stands. On the other hand, the electronic control unit 3 proceeds to the processing of step S19 if the normal restart condition does not stand.

At step S17, the electronic control unit 3 makes the internal combustion engine 1 automatically restart.

At step S18, the electronic control unit 3 returns the flag F2 to "0" to enable the internal combustion engine 1 to be automatically made to stop as usual when the engine stop condition next stands.

At step S19, the electronic control unit 3 judges if despite the traffic conditions, the state is one where the internal combustion engine 1 should be restarted and the host vehicle should start to be moved. Specifically, the electronic control unit 3 judges if the distance between vehicles has become the second distance B1 or more. The electronic control unit 3 judges that the state is one where the internal combustion engine 1 should be restarted and the host vehicle should start to be moved regardless of the traffic conditions and proceeds to the processing of step S21 if the distance between vehicles is the second distance B1 or more. On the other hand, the electronic control unit 3 continues the idle reduction mode until the normal restart condition stands if the distance between vehicles is less than the second distance B1 so as to suppress deterioration of the fuel efficiency as much as possible.

At step S20, the electronic control unit 3 makes the internal combustion engine 1 restart so as to prepare for starting to move the host vehicle since it is considered that the host vehicle should start to be moved regardless of the traffic conditions. Due to this, when the driver does not notice the preceding vehicle starting to move, it is possible to start to move the host vehicle immediately after the driver notices the preceding vehicle starting to move and, in some cases, possible to draw the attention of the driver to make him notice the preceding vehicle starting to move by the noise or vibration caused by restart of the internal combustion engine 1. For this reason, it is possible to keep the distance between vehicles from becoming larger than the second distance B1 or more and possible to suppress worsening congestion.

Note that, even if making the internal combustion engine 1 restart, the driver may not notice the preceding vehicle starting to move in some cases, so when making the internal combustion engine 1 restart at step S20, as explained above, when making the internal combustion engine 1 restart or before that, it is desirable to inform the driver of the preceding vehicle starting to move by, for example, sounding a buzzer. Due to this, it is possible to reliably make the driver notice the preceding vehicle starting to move and possible to more effectively suppress worsening congestion.

Further, in the flow chart of FIG. 2, at step S8 or step S12 and step S19, the distance between vehicles was used as the parameter relating to the distance between vehicles, but instead of the distance between vehicles, it is also possible to use the distance of movement of the preceding vehicle after the preceding vehicle has started to move or the time period of movement of the preceding vehicle after the preceding vehicle has started to move so as to judge to what extent the preceding vehicle has drawn away from the host vehicle. Specifically, at for example step S8, it is possible to judge if the distance of movement of the preceding vehicle is a predetermined first distance A2 or more. The first distance A2 corresponds to the first distance A1 minus the distance between the host vehicle and the preceding vehicle before the preceding vehicle starts to move. Further, at step S8, it is also possible to judge if the time period of movement of the preceding vehicle is a predetermined time period A3 or more.

Figure 3:
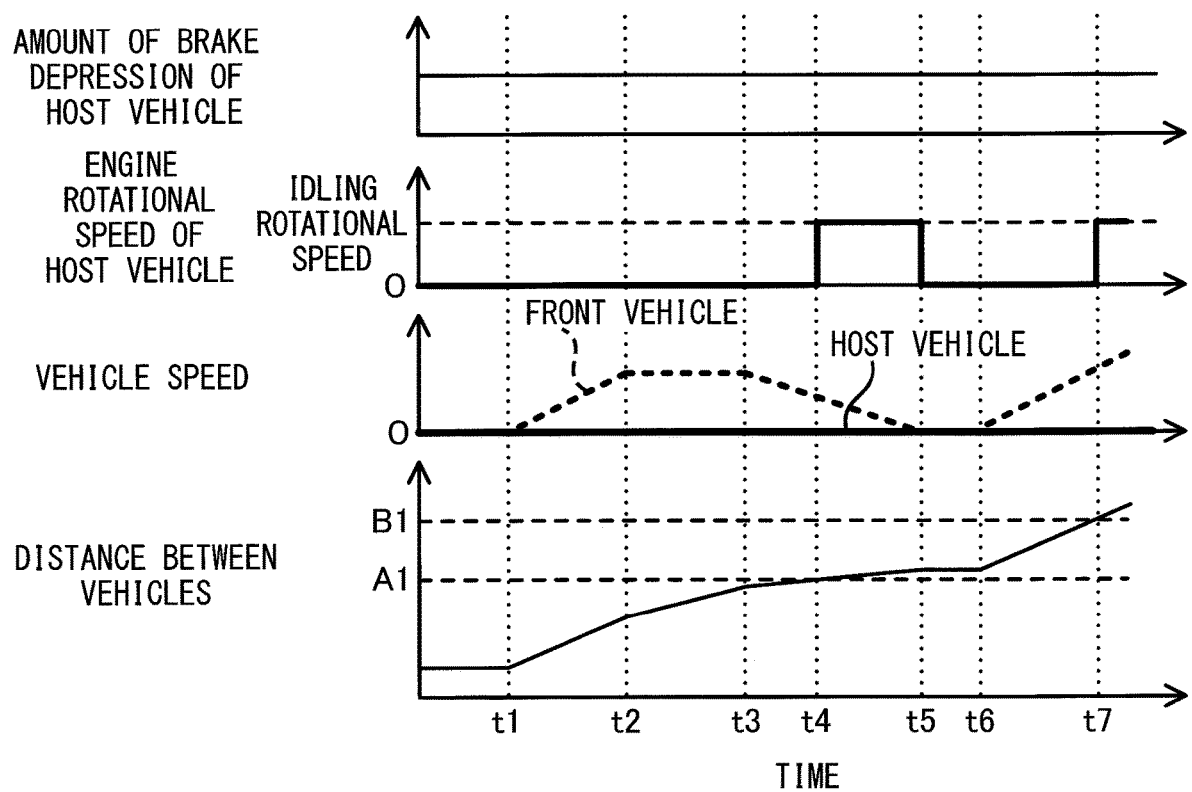
FIG. 3 is a time chart for explaining the operation in idle reduction control according to the first embodiment of the present disclosure.

FIG. 3 is a time chart for explaining the operation of the idle reduction control according to the present embodiment.

The preceding vehicle temporarily stops before the time t1, starts to move at the time t1, then accelerates up to the time t2. From the time t2 to the time t3, it is driven at an equal speed. From the time t3, it decelerates and at the time t5 it is further temporarily stopped. Further, it again starts to move at the time t6.

The host vehicle, before the time t1, temporarily stops in the same way as the preceding vehicle and is in the idle reduction mode. During the idle reduction mode, until the distance between vehicles becomes the first distance A1 or more, for example, the amount of brake depression becomes zero etc. Basically, the idle reduction mode is continued until the driver intends to start to move the vehicle 10. In this time chart, the brake pedal is depressed from the time t1 on as well. Until the time 4, the distance between vehicles is also less than the first distance A1, so up to the time t4, the idle reduction mode is continued.

If, at the time t4, during the idle reduction mode, the distance between vehicles becomes the first distance A1 or more, it is judged that there is a possibility of the driver not noticing the preceding vehicle starting to move. To keep the vehicle from being delayed in starting to move, the internal combustion engine 1 is automatically restarted.

Further, if, in this way, making the internal combustion engine 1 automatically restart since the distance between vehicles becomes the first distance A1 or more, when the host vehicle continues to be stopped, depending on the traffic conditions, the driver may not start to move the host vehicle, so it is judged if the preceding vehicle has stopped before the distance between vehicles becomes the second distance B1.

In this time chart, at the time t5 before the distance between vehicles becomes the second distance B1, the preceding vehicle has stopped, so at the point of time of the time t5, it is judged that the driver has not started to move the host vehicle due to the traffic conditions, the internal combustion engine 1 is made to automatically stop, and the idle reduction state is returned to. Due to this, it is possible to keep the internal combustion engine from being restarted along with the preceding vehicle starting to move while the host vehicle is stopped despite the driver not intending to start to move the vehicle and to keep the idle state from ending up being continued as it is, so it is possible to keep the fuel efficiency and exhaust emissions and the noise and vibration performance while the vehicle is stopped from deteriorating.

At the time t5 on, if the normal restart condition stands, the internal combustion engine 1 is made to automatically restart. Further, if, like in this time chart, the normal restart condition does not stand, when at the time t7 the distance between vehicles becomes the second distance B1 or more, the internal combustion engine 1 is made to automatically restart.

The vehicle 10 according to the present embodiment explained above is provided with an internal combustion engine 1 as the vehicle drive source, a preceding vehicle information acquiring device 2 configured to acquire preceding vehicle information relating to a preceding vehicle, including the distance between vehicles (parameter relating to distance between vehicles which becomes greater the wider the distance between the host vehicle and the preceding vehicle), and an electronic control unit 3 configured to control the vehicle drive source.

Further, the electronic control unit 3 is configured so that when the distance between vehicles becomes the first distance A1 (first predetermined value) or more during the idle reduction mode where the internal combustion engine 1 is automatically made to stop, the internal combustion engine 1 is automatically made to restart and so that when the host vehicle continues to be stopped even after the internal combustion engine 1 is automatically made to restart, the internal combustion engine 1 is again automatically made to stop when the preceding vehicle stops before the distance between vehicles becomes the second distance B1 (second predetermined value) greater than the first distance A1.

Due to this, it is possible to keep the internal combustion engine from being restarted along with the preceding vehicle starting to move while the host vehicle is stopped despite the driver not intending to start to move the vehicle and to keep the idle state from ending up being continued as it is. That is, it is possible to again make the internal combustion engine automatically stop and return to the idle reduction state suitably in accordance with the traffic conditions when the internal combustion engine is restarted along with the preceding vehicle starting to move while the host vehicle is stopped. Therefore, it is possible to keep the fuel efficiency and exhaust emissions and the noise and vibration performance while the vehicle is stopped from deteriorating.

Further, the electronic control unit 3 according to the present embodiment is further configured so as to make the internal combustion engine 1 automatically restart when the distance between vehicles becomes the second distance B1 (second predetermined value) or more if making the internal combustion engine 1 again automatically stop.

Due to this, when the driver has not noticed the preceding vehicle starting to move, it is possible to start the host vehicle moving immediately after the driver notices the preceding vehicle starting to move and, in some cases, possible to draw the attention of the driver to make him notice the preceding vehicle starting to move by the noise or vibration caused by restart of the internal combustion engine 1. Therefore, it is possible to keep the idle reduction mode from continuing without the preceding vehicle starting to move being noticed and keep the host vehicle starting to move from being delayed when starting to move the host vehicle and possible to keep the distance between vehicles from becoming larger than the second distance B1 or more. Further, due to this, worsening of congestion can be suppressed.

Second Embodiment

Next, a second embodiment of the present disclosure will be explained. The present embodiment differs from the first embodiment on the point of making the internal combustion engine 1 restart according to whether the preceding vehicle has started to move when the distance between vehicles is less than the second distance B1 and the internal combustion engine 1 has automatically stopped and entered the idle reduction mode. Below, this point of difference will be focused on in the explanation.

Figure 4:
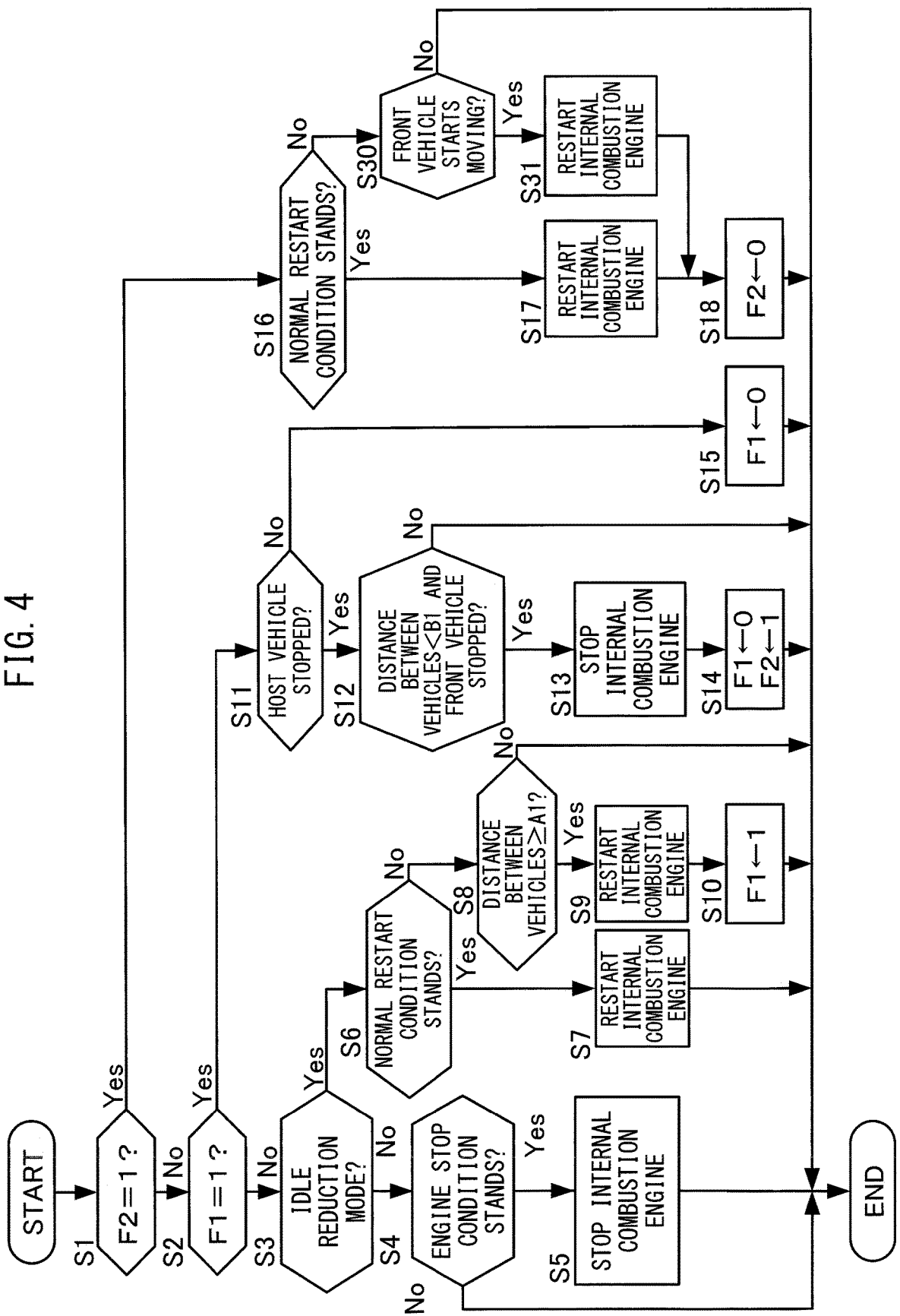
FIG. 4 is a flow chart for explaining idle reduction control according to a second embodiment of the present disclosure.

FIG. 4 is a flow chart for explaining idle reduction control according to the present embodiment. The electronic control unit 3 repeatedly performs the present routine by a predetermined processing period during operation of the vehicle 10.

In FIG. 4, the content of the processing from step S1 to step 18 is similar to the first embodiment, so explanations will be omitted here.

At step S30, the electronic control unit 3 judges if the preceding vehicle has started to move. The electronic control unit 3 proceeds to the processing of step S31 if the preceding vehicle has started to move. On the other hand, the electronic control unit 3 makes the idle reduction mode continue so as to keep the fuel efficiency from deteriorating if the preceding vehicle is stopped.

At step S31, the electronic control unit 3 judges that there is a high possibility that the driver has started to move the host vehicle when the preceding vehicle, which was stopped in a state with a distance between vehicles of the first distance A1 to less than the second distance B1, starts to move and makes the internal combustion engine 1 restart so as to prepare for the host vehicle starting to move.

Figure 5:
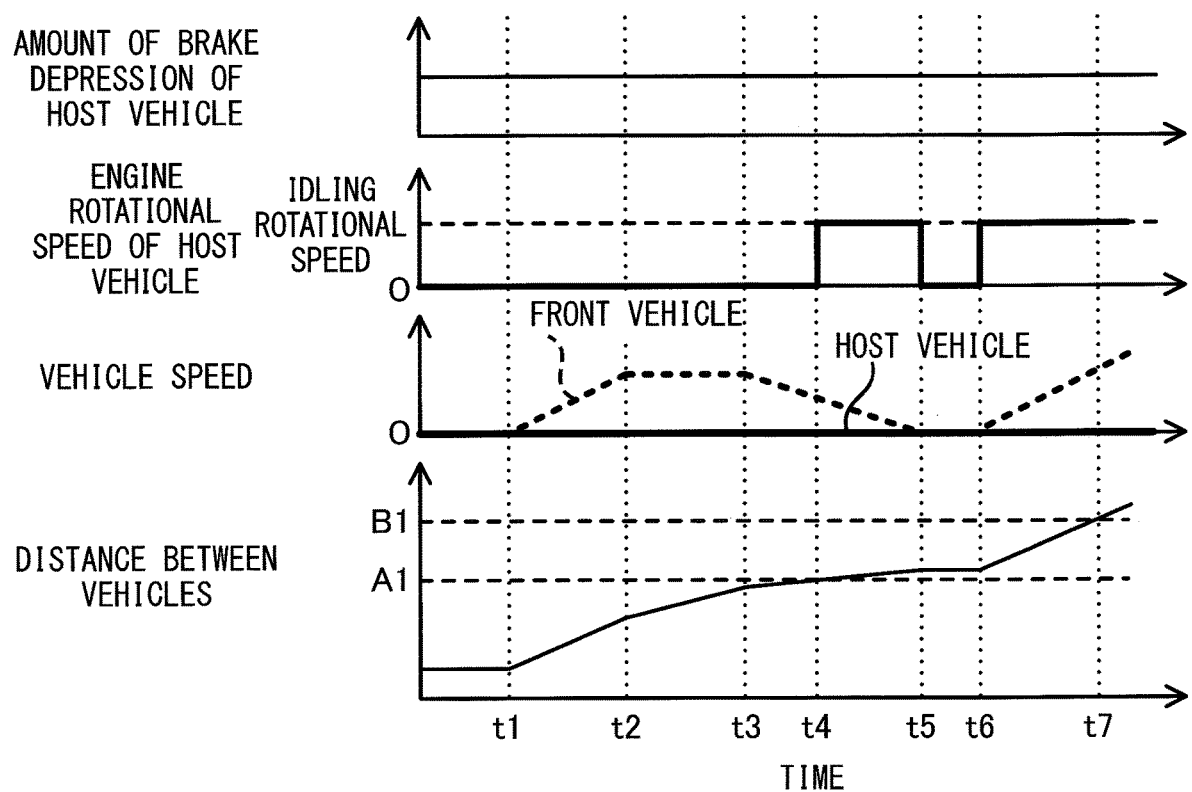
FIG. 5 is a time chart for explaining the operation in idle reduction control according to the second embodiment of the present disclosure.

FIG. 5 is a time chart for explaining the operation of idle reduction control according to the present embodiment.

The operation in the idle reduction control up to the time t5 is similar to the first embodiment.

Further, in the above-mentioned first embodiment, at the time t5 on, when the distance between vehicles becomes the second distance B1 or more at the time t7, the internal combustion engine 1 was made to automatically restart, but as shown in FIG. 5, in the present embodiment, the internal combustion engine 1 is made to automatically restart when the preceding vehicle starts to move at the time t6.

The electronic control unit 3 according to the present embodiment explained above, like the first embodiment, is configured to make the internal combustion engine 1 automatically restart when the distance between vehicles becomes the first distance A1 (first predetermined value) or more during the idle reduction mode where the internal combustion engine 1 is automatically made to stop and to make the internal combustion engine 1 again automatically stop before the distance between vehicles becomes the second distance B1 (second predetermined value) larger than the first distance A1 when the host vehicle continues to be stopped even after making the internal combustion engine 1 automatically restart.

Further, the electronic control unit 3 according to the present embodiment is further configured to automatically make the internal combustion engine 1 restart when the preceding vehicle starts to move in the case of making the internal combustion engine 1 again automatically stop.

Due to this, when the driver does not notice the preceding vehicle starting to move, it is possible to start to move the host vehicle immediately after noticing the preceding vehicle starting to move and, in some cases, possible to draw the attention of the driver to make him notice the preceding vehicle starting to move by the noise or vibration caused by restart of the internal combustion engine 1. For this reason, it is possible to keep the idle reduction mode from continuing while the preceding vehicle starting to move is not noticed and to keep the host vehicle starting to move from ending up being delayed when starting to move it. As a result, congestion can be kept from worsening.

Above, embodiments of the present disclosure were explained, but the embodiments only show part of the examples of application of the present disclosure and are not designed to limit the technical scope of the present disclosure to the specific configurations of the embodiments.

Figure 6:
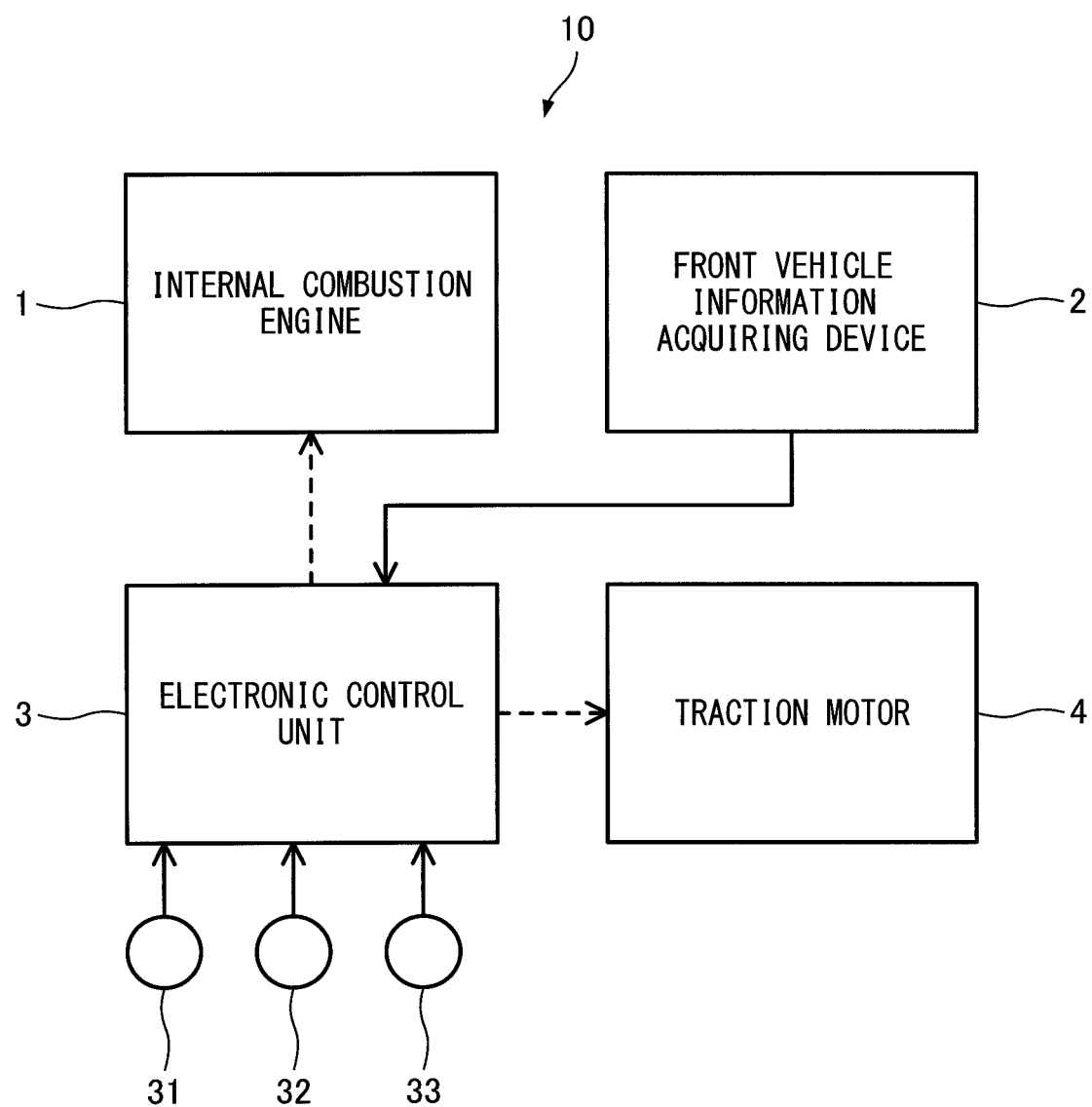
FIG. 6 is a schematic view of the configuration of an idle reduction control system in a vehicle according to a modification of the present disclosure.

For example, as shown in FIG. 6, in the case of a vehicle 10 provided with a traction motor 4 in addition to an internal combustion engine 1 as a vehicle drive source (for example, a hybrid vehicle or a plug-in hybrid vehicle), instead of making the internal combustion engine 1 restart at step S7 or step S9, step S17, step S20, and step S31 in the flow charts of FIG. 2 and FIG. 4, it is also possible to use the traction motor 4 to generate a drive force corresponding to the creep torque as required. Further, if using the traction motor 4 to generate a drive force corresponding to the creep torque instead of making the internal combustion engine 1 restart, it is also possible to stop driving the traction motor 4 at step S13 of the flow charts of FIG. 2 and FIG. 4.

That is, the electronic control unit 3 may be configured so as to make the internal combustion engine 1 automatically restart when the distance between vehicles (parameter) becomes the first distance A1 (first predetermined value) or more during the idle reduction mode where the internal combustion engine 1 is made to automatically stop or, alternatively, so as to stop driving the traction motor 4 when the preceding vehicle stops before the distance between vehicles becomes the second distance B1 (second predetermined value) when driving the traction motor 4 and the host vehicle continues stopped even after driving the traction motor 4. Due to this, it is possible to keep electric power from being wastefully consumed while the vehicle is stopped, so it is possible to suppress deterioration of the electric power efficiency.

Note that, instead of making the internal combustion engine 1 restart in this way, if making the traction motor 4 generate a drive force corresponding to the creep torque, unlike the case of restarting the internal combustion engine 1, almost no noise or vibration will be generated, so it is not possible to use the noise or vibration caused by restart of the internal combustion engine 1 to draw the attention of the driver to the front. Therefore, it is desirable to inform the driver of the fact of the preceding vehicle starting to move by for example a buzzer etc. as explained above. Further, since it is difficult to draw the attention of the driver to the front compared with when restarting the internal combustion engine 1, to reliably inform the driver of the preceding vehicle starting to move, it is also possible to make the buzzer sound larger than the buzzer sound when making the internal combustion engine 1 restart.

Further, while not shown, in the case of a vehicle 10 provided with a traction motor 4 instead of an internal combustion engine 1 as a vehicle drive source (for example, an electric vehicle), the electronic control unit 3 may be configured so as to drive the traction motor 4 to cause it to generate a drive force corresponding to the creep torque when the distance between vehicles (parameter) becomes the first distance A1 (first predetermined value) while the host vehicle is stopped and to stop driving the traction motor 4 when the preceding vehicle stops before the distance between vehicles becomes the second distance B1 (second predetermined value) when the host vehicle continues stopped even after driving the traction motor 4. Due to this, it is possible to keep electric power from being wastefully consumed while the vehicle is stopped, so it is possible to suppress deterioration of the electric power efficiency.

Further, in the above embodiments, the distance from the preceding vehicle or the distance of movement or time period of movement were calculated based on a reflected wave of a milliwave fired from a milliwave radar sensor to the front of the host vehicle, but, for example, it is also possible to estimate these from the speed information etc. of the preceding vehicle obtained through the vehicle-to-vehicle communicating device.

The invention claimed is:

1. A host vehicle comprising:
    a host vehicle drive source including an internal combustion engine;
    a preceding vehicle information acquiring device configured to acquire preceding vehicle information relating to a preceding vehicle, including a parameter relating to a distance between vehicles which becomes greater the wider the distance between the host vehicle and the preceding vehicle; and
    an electronic control unit configured to:
        control the host vehicle drive source,
        automatically restart the internal combustion engine when the parameter becomes a first predetermined value or more following an idle reduction mode where the internal combustion engine is automatically made to stop, and
        automatically stop the internal combustion engine again when the preceding vehicle has stopped before the parameter becomes a second predetermined value larger than the first predetermined value when the electronic control unit determines that the host vehicle remains unmoved even after making the internal combustion engine automatically restart.

2. The host vehicle according to claim 1, wherein
    the electronic control unit is further configured to make the internal combustion engine automatically restart when the parameter becomes the second predetermined value or more after making the internal combustion engine again automatically stop.

3. The host vehicle according to claim 1, wherein
    the electronic control unit is further configured to make the internal combustion engine automatically restart when the preceding vehicle starts moving after making the internal combustion engine again automatically stop.

4. The host vehicle according to claim 1,
    wherein the vehicle drive source further includes a traction motor, and
    the electronic control unit is further configured to:
    drive the traction motor when the parameter becomes the first predetermined value or more following the idle reduction mode where the internal combustion engine is made to automatically stop and
    stop driving the traction motor when the preceding vehicle stops before the parameter becomes the second predetermined value when the host vehicle continues unmoved even after driving the traction motor.

5. A host vehicle comprising: a host vehicle drive source including a traction motor; a preceding vehicle information acquiring device configured to acquire preceding vehicle information relating to a preceding vehicle, including a parameter relating to a distance between vehicles which becomes greater the wider the distance between the host vehicle and the preceding vehicle; and an electronic control unit configured to: control the host vehicle drive source, automatically restart the traction motor when the parameter becomes a first predetermined value or more following when the traction motor was stopped, and automatically stop driving the traction motor again when the preceding vehicle has stopped before the parameter becomes a second predetermined value larger than the first predetermined value when the electronic control unit determines that the host vehicle remains stepped unmoved even after driving the traction motor.

6. The host vehicle according to claim 1, wherein
the parameter is the distance between the host vehicle and the preceding vehicle.

7. The host vehicle according to claim 1, wherein
the parameter is the distance of movement of the preceding vehicle after the preceding vehicle started moving.

8. The host vehicle according to claim 1, wherein
the parameter is the time period of movement of the preceding vehicle from when the preceding vehicle started moving.

* * * * *